United States Patent
Kato

(10) Patent No.: US 8,125,657 B2
(45) Date of Patent: Feb. 28, 2012

(54) PRINTING APPARATUS AND METHOD AND NON-TRANSITORY COMPUTER-READABLE STORAGE MEDIUM FOR MANAGING PRINTING FORMAT INFORMATION

(75) Inventor: Kazunori Kato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1095 days.

(21) Appl. No.: 11/686,180

(22) Filed: Mar. 14, 2007

(65) Prior Publication Data

US 2007/0229873 A1    Oct. 4, 2007

(30) Foreign Application Priority Data

Mar. 31, 2006   (JP) ................. 2006-100195

(51) Int. Cl.
*G06F 3/12* (2006.01)

(52) U.S. Cl. ............ 358/1.13; 358/1.14; 358/1.15

(58) Field of Classification Search ........... 358/1.13, 358/1.14, 1.15
See application file for complete search history.

(56) References Cited

U.S. PATENT DOCUMENTS

| | | | | |
|---|---|---|---|---|
| 7,382,487 B2* | 6/2008 | Ikegami | | 358/1.6 |
| 7,715,030 B2* | 5/2010 | Higashiura et al. | | 358/1.14 |
| 2004/0141203 A1* | 7/2004 | Honma | | 358/1.15 |
| 2004/0193546 A1* | 9/2004 | Tokutani et al. | | 705/59 |
| 2005/0078332 A1* | 4/2005 | Brown | | 358/1.14 |
| 2006/0034630 A1* | 2/2006 | Yabe | | 399/82 |
| 2006/0044607 A1* | 3/2006 | Kato | | 358/1.15 |
| 2006/0132823 A1* | 6/2006 | Sakamoto | | 358/1.14 |

FOREIGN PATENT DOCUMENTS

JP    2001-337803 A    12/2001
JP    2005-092255 A    4/2005

* cited by examiner

*Primary Examiner* — Mark K Zimmerman
*Assistant Examiner* — Jacky X Zheng
(74) *Attorney, Agent, or Firm* — Canon U.S.A., Inc. IP Division

(57) ABSTRACT

An apparatus identifies one of a plurality of users or one of a plurality of groups that has issued a printing request and enables selection of one of printing purposes associated with the identified user or the identified group. The apparatus acquires printing format restriction information corresponding to the selected printing purpose and issues an instruction for execution of printing processing within a range of the acquired printing format restriction information.

3 Claims, 16 Drawing Sheets

| PRINTING PURPOSE | PERMITTED PRINTING FORMAT | |
|---|---|---|
| MATERIAL FOR DIVISION MEETING | MONOCHROME, DUPLEX, 2 UP · 4 UP | 211 |
| MATERIAL FOR CUSTOMER PRESENTATION | COLOR · MONOCHROME, DUPLEX, 1 UP · 2 UP · 4 UP | 212 |
| CLERICAL DOCUMENT | COLOR · MONOCHROME, SINGLE-SIDED, 1 UP | 213 |

FIG. 5

| 301 USER/USER GROUP | 302 AVAILABLE PRINTING PURPOSE | 303 NUMBER OF AVAILABLE TIMES | 304 NUMBER OF TIMES USED | 305 NUMBER OF PRINTABLE PAGES | |
|---|---|---|---|---|---|
| 311 kato | MATERIAL FOR DIVISION MEETING | 10 | 5 | 100 | ← 311-1 |
| | CLERICAL DOCUMENT | 10 | 1 | 20 | ← 311-2 |
| 312 Sales | MATERIAL FOR CUSTOMER PRESENTATION | — | 70 | 100 | ← 312-1 |
| | CLERICAL DOCUMENT | 10 | 1 | 50 | ← 312-2 |
| 313 A project | MATERIAL FOR CUSTOMER PRESENTATION | 20 | 1 | 200 | ← 313-1 |

FIG. 6

| NAME OF USER GROUP (2201) | MEMBER (2202) | |
|---|---|---|
| Sales | yoshida, tanaka | 2211 |
| A project | sato, machida | 2212 |

FIG. 7

SELECT PRINTING PURPOSE

- MATERIAL FOR DIVISION MEETING
- CLERICAL DOCUMENT

PURPOSE = MATERIAL FOR DIVISION MEETING — 401
USERNAME = KATO — 402
STRICT_DUPLEX = TRUE — 403
STRICT_NUP = 2,4 — 404
STRICT_COLOR = TRUE — 405
MAX_PRINT = 100 — 406

FIG. 9

PRINT SETTINGS  [×]

PRINTING METHOD (Y)
RB1 — ● SINGLE-SIDED PRINTING
RB2 — ○ DUPLEX PRINTING
— 1201

PAGE LAYOUT (L): [ TWO PAGES/SHEET ▼ ] — 1202

ORDER OF ARRANGEMENT (O): [ FROM LEFT TO RIGHT ▼ ] — 1203

COLOR MODE (C): [ MONOCHROME ▼ ] — 1204

[ OK ]  [ CANCEL ]
— 1205

FIG. 21

LOGIN

USER NAME:
kato — 2001

PASSWORD:
**** — 2002

COPY

NUMBER OF COPIES  10  PAGES

◉ SINGLE-SIDED   ◉ DUPLEX — 2101
◉ 1 UP           ○ 2 UP       ◉ 4 UP — 2102
◉ COLOR          ◉ MONOCHROME — 2103

START

FIG. 23

| DIRECTORY INFORMATION |
|---|
| FIRST DATA PROCESSING PROGRAM<br>PROGRAM CODE GROUP CORRESPONDING TO STEPS OF FLOWCHART SHOWN IN FIG. 17 |
| SECOND DATA PROCESSING PROGRAM<br>PROGRAM CODE GROUP CORRESPONDING TO STEPS OF FLOWCHART SHOWN IN FIG. 18 |
| THIRD DATA PROCESSING PROGRAM<br>PROGRAM CODE GROUP CORRESPONDING TO STEPS OF FLOWCHART SHOWN IN FIG. 19 |
| FOURTH DATA PROCESSING PROGRAM<br>PROGRAM CODE GROUP CORRESPONDING TO STEPS OF FLOWCHART SHOWN IN FIG. 20 |
| |

PRINTING APPARATUS AND METHOD AND NON-TRANSITORY COMPUTER-READABLE STORAGE MEDIUM FOR MANAGING PRINTING FORMAT INFORMATION

BACKGROUND OF THE INVENTION

1. Field of the Invention

The present invention relates to a printing apparatus that is capable of communicating with an information processing apparatus, for example, to a technology for restricting printing.

2. Description of the Related Art

Recently, reductions in the total cost of ownership (TCO) including not only the initial installation costs for printing apparatuses and systems but also the costs of consumable supplies, such as print sheets and coloring agents typified by toner, have drawn great attention for reducing office costs or for conservation of the global environment.

In addition, in terms of security, systems in which only particular users are able to perform printing are available.

There has been a problem, for example, in which anyone who can access a network is able to perform printing using a printing apparatus installed in an office.

Since printing restrictions are not imposed on anyone and no trace of printing is left, users can readily perform unauthorized printing without fear of consequences. Thus, an excessive amount of printing is often performed, resulting in an increase in the office costs. In addition, in order to reduce the amount of consumable supplies, such as print sheets and toner, to be used, restrictions may be imposed on the maximum number of printable pages, execution of single-sided printing, and execution of color printing.

Under such circumstances, many printing systems are available. As a first system, a printing system in which printing restrictions are controlled using address information, such as an IP address in a transmission control protocol/internet protocol (TCP/IP), is available. In addition, as a second system, a printing system in which only a user who successfully completes user authentication is allowed to perform printing is available.

However, the first system involves blanket control in which a restriction is imposed on a particular IP address, and the first system cannot achieve more individualized control, such as restricting the maximum number of sheets to be output for a particular user. In the second system, although control is performed such that only a particular user is allowed to perform printing, a restriction cannot be imposed on settings of a printing format.

In order to solve the above-mentioned problems, a printing format restriction method is disclosed in Japanese Patent Laid-Open No. 2001-337803. In this method, for each user, a permitted printing method, such as N-up printing, and printing conditions, such as the maximum number of printable pages, are set. In addition, user information added to a print job is identified, and printing is performed by the printing method permitted for the user.

A technology disclosed in Japanese Patent Laid-Open No. 2005-092255 is also available. In this technology, in order to perform distributed printing with unified fonts while suppressing a reduction in the efficiency of printing processing, a host computer sets printing conditions entered from an input unit with a setting unit. A determination unit determines whether the printing conditions include designated distributed printing in which print data is printed by a plurality of printers. If the determination unit determines that the printing conditions are set to distributed printing, a setting screen indicating that a font setting restriction unit in the setting unit does not accept settings for use of font data stored in a printing apparatus is displayed on a display unit.

In the printing system according to Japanese Patent Laid-Open No. 2001-337803, a printing format restriction is imposed on each user. However, this method has the problems described below.

Since restrictions relating to printing formats, such as single-sided printing, duplex printing, color printing, monochrome printing, and N-up printing, are imposed on each user, a particular user cannot perform single-sided printing, color printing, and 1-up printing.

Although such restrictions do not cause problems in making materials for division meetings or the like, processing using restricted functions may be required according to the printing purpose, for example, for making materials for a customer presentation, legal documents, or the like. Thus, almost all the printing formats are permitted to everyone, resulting in failure to attain the original purpose of restriction.

In the technology disclosed in Japanese Patent Laid-Open No. 2005-092255, for print data received from a particular user, if printing conditions set for the user are different from printing conditions set by a printing condition setting unit, a printing request is denied. Thus, the running cost of the printing apparatus including print sheets can be reduced.

However, in such control for setting printing conditions for each user, execution of a print job cannot be restricted according to a printing purpose of the user. Thus, a printing format cannot be restricted on the basis of both the identity of the user and the printing purpose. Since a printing format restriction imposed on each user is insufficient for restricting execution of a print job on the basis of both the identity of a user and a printing purpose, almost all the printing formats are permitted to everyone, resulting in failure to attain the original purpose of restriction.

In a case where all the print jobs are canceled without exception when printing conditions are not satisfied, even if the number of printed pages has not yet reached the maximum number of printable pages that is allocated to a user, a request, for example, for performing printing until the number of printed pages reaches the maximum number of printable pages cannot be flexibly accepted, thus reducing the level of convenience.

In addition, in the technology disclosed in Japanese Patent Laid-Open No. 2005-092255, management of a printing purpose for which a printing format restriction is imposed and a history including a print job is not performed. Thus, an administrator cannot determine from a history whether a printing purpose of each user is authorized or unauthorized. Thus, a user who performs printing in which a printing restriction is violated cannot be identified.

SUMMARY OF THE INVENTION

An embodiment of the present invention provides a mechanism for acquiring printing format restriction information based on a printing purpose selected for each user or each group and for instructing a printing apparatus to execute printing processing within a range of the printing format restriction information.

An embodiment of the present invention also provides a mechanism for acquiring printing format restriction information based on a printing purpose selected for each user or each group and for issuing an instruction for execution of printing processing within a range of the printing format restriction information.

An information processing apparatus according to an aspect of the present invention including a printer driver that generates a print job to be transmitted to a printing apparatus includes an identification unit that identifies one of a plurality of users or one of a plurality of groups that has issued a printing request; a setting unit that sets selectable printing purposes associated with the identified user or the identified group; a selection unit that selects one of the printing purposes set by the setting unit; an acquisition unit that acquires printing format restriction information corresponding to the printing purpose selected by the selection unit; and an execution-instructing unit that issues an instruction for execution of printing processing within a range of the printing format restriction information acquired by the acquisition unit.

According to an embodiment of the information processing apparatus, since printing format restriction information based on a printing purpose selected for each user or each group is acquired, an instruction for execution of printing processing within a range of the printing format restriction information can be issued to a printing apparatus.

In addition, a selectable printing purpose can be set for each user, and a printing format restriction can be set for each printing purpose. Thus, in the information processing apparatus, a printing setting screen for which a printing format restriction is provided in accordance with the printing purpose of the corresponding user can be displayed.

A printing apparatus according to an aspect of the present invention including an operation unit includes an identification unit that identifies one of a plurality of users or one of a plurality of groups that has issued a printing request; a setting unit that sets selectable printing purposes associated with the identified user or the identified group; a selection unit that selects one of the printing purposes set by the setting unit; an acquisition unit that acquires printing format restriction information corresponding to the printing purpose selected by the selection unit; and an execution-instructing unit that issues an instruction for execution of printing processing within a range of the printing format restriction information acquired by the acquisition unit.

According to an embodiment of the printing apparatus, since printing format restriction information based on a printing purpose selected for each user or each group is acquired, an instruction for execution of printing processing within a range of the printing format restriction information can be issued.

In addition, a selectable printing purpose can be set for each user, and a printing format restriction can be set for each printing purpose. Thus, in the printing apparatus, a printing setting screen for which a printing format restriction is provided in accordance with the printing purpose of the corresponding user can be displayed.

Other features and advantageous of the present invention will be apparent from the following description taken in conjunction with the accompanying drawings, in which like reference characters designate the same or similar parts throughout there of.

BRIEF DESCRIPTION OF THE DRAWINGS

FIG. 5 shows an example of a printing purpose table, which represents printing purposes for individual users, that stores printing purposes selectable by individual users and that is held by the authentication server shown in FIG. 1.

FIG. 6 shows an example of a user group table that represents members of individual user groups and that is held in the authentication server shown in FIG. 1.

FIG. 7 shows an example of a user interface used for selecting a printing purpose and displayed by a UI operation unit shown in FIG. 3.

FIG. 8 shows an example of a form of a restriction ticket generated by the authentication server.

FIG. 9 shows an example of a printing format setting screen displayed by the UI operation unit shown in FIG. 3.

FIG. 21 shows an example of a login screen performed by a printing apparatus according to another embodiment.

FIG. 22 shows an example of a printing format setting screen displayed on a display device by the UI operation unit shown in FIG. 3.

FIG. 23 is an illustration for explaining a memory map of a storage medium in which various data processing programs that can be read by the printing apparatus according to each of the embodiments of the present invention are stored.

DESCRIPTION OF THE EMBODIMENTS

Embodiments of the present invention will be described with reference to the drawings.
<System Configuration>

First Embodiment

Figure 1:
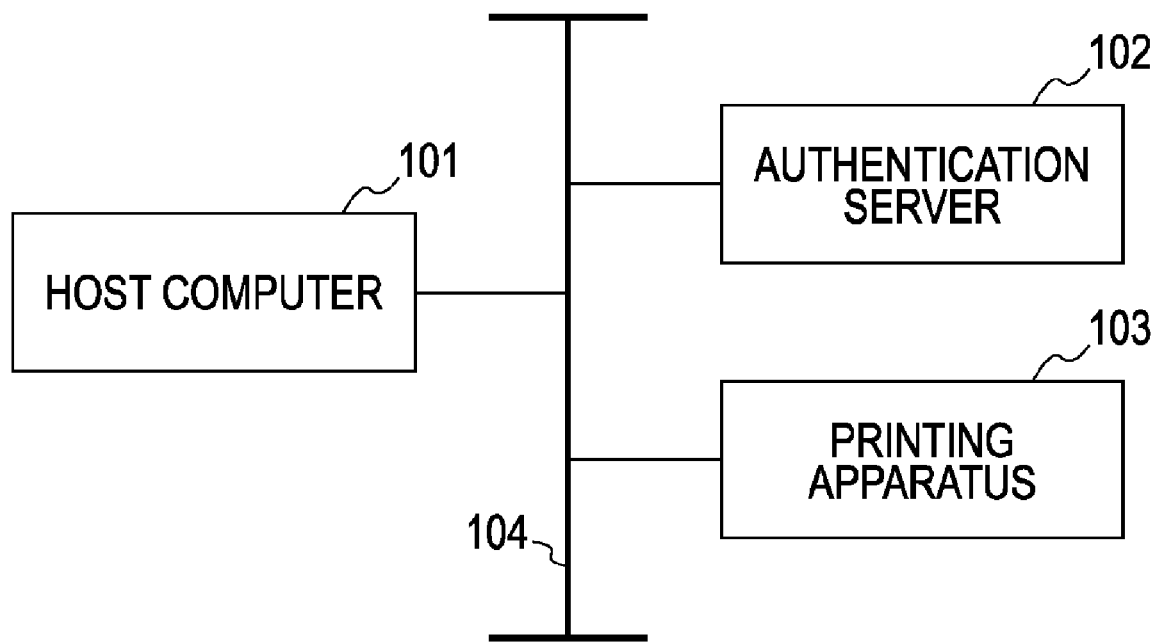
FIG. 1 is a block diagram showing a configuration of a printing system in which an information processing apparatus, a server apparatus, and a printing apparatus according to a first embodiment are employed.

FIG. 1 is a block diagram showing a configuration of a printing system according to a first embodiment in which an information processing apparatus, a server apparatus, and a printing apparatus are employed.

Referring to FIG. 1, a predetermined operating system (OS) is installed in a host computer 101. The host computer 101 generates, via a pro-driver under the control of the OS, a print job in response to a printing request received from a user, and performs printing.

An authentication server 102 contains a memory that holds user authentication information and output restriction information for a printing apparatus 103. An authority to access the memory can be referred to by an administrator who has an administrative authority.

The printing apparatus 103 receives a print job via a network 104. The printing apparatus 103 performs printing on an actual sheet using known a printing technology, such as an electrophotographic technology or an inkjet technology. The authentication server 102 may operate on the host computer 101 or the printing apparatus 103.

The host computer 101, the authentication server 102, and the printing apparatus 103 are connected to each other via the network 104, which is based on a suitable technology, such as the Ethernet®.

In the first embodiment, a case where the authentication server 102 performs authentication of a user who uses the printing apparatus 103 will be described. However, in another embodiment of the present invention, the printing apparatus 103 may perform authentication.

In addition, in the first embodiment, a case of a printing apparatus will be described. However, in another embodiment of the present invention, an image processing apparatus, such as multifunction peripheral (MFP) including a reader unit and a printer unit, may be used.

The host computer 101 includes, as hardware resources, a control board including a central processing unit (CPU), a read-only memory (ROM), a random-access memory (RAM), and the like. An input/output device is connected to the host computer 101 with a predetermined interface therebetween. The host computer 101 loads an OS installed in an external storage device, such as a hard disk, to the RAM, and executes various types of application software. The host computer 101 also includes a communication control device, such as a network interface controller (NIC), and is capable of communicating with the authentication server 102 and the printing apparatus 103 via the network 104 in accordance with a predetermined protocol.

Similarly, the printing apparatus 103 includes, as hardware resources, a control board including a CPU, a ROM, a RAM, and the like. An operation unit is connected to the printing apparatus 103 with a predetermined interface therebetween. The printing apparatus 103 executes various types of function processing by loading a control program, which is stored in the ROM from an external storage device, such as a hard disk, to the RAM.

An outline of operations of the system including the host computer 101, the authentication server 102, and the printing apparatus 103 will now be explained.

Figure 2:
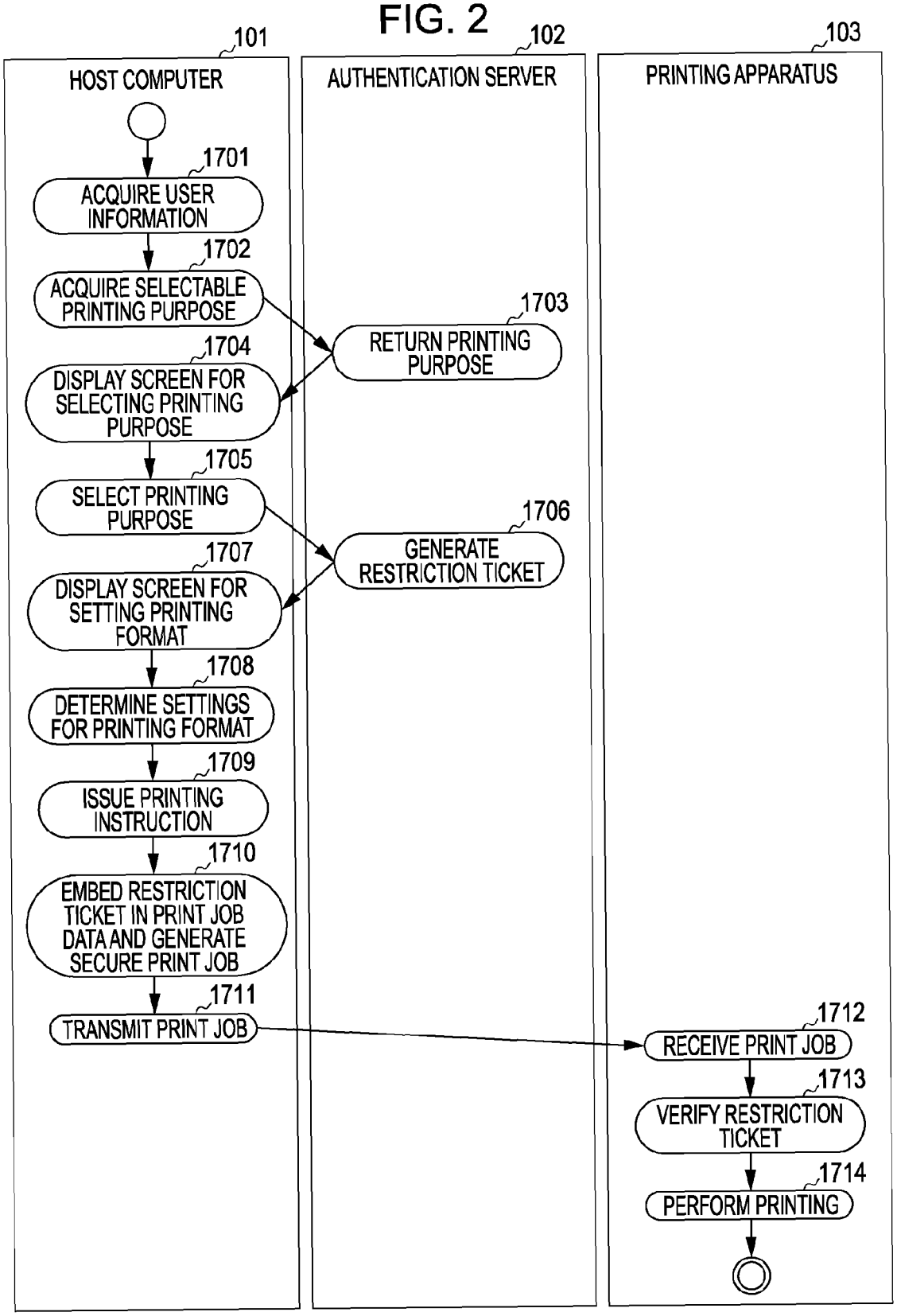
FIG. 2 is an illustration for explaining a data flow of the printing system shown in FIG. 1 according to an embodiment of the present invention.

FIG. 2 illustrates a data flow of the printing system shown in FIG. 1 according to an embodiment of the present invention.

Referring to FIG. 2, the host computer 101 acquires user information of a user who intends to issue a printing instruction (step S1701). The host computer 101 acquires from the authentication server 102 printing purposes that can be selected by the user (steps S1702 and S1703), and displays the acquired printing purposes.

When the user selects a printing purpose on a printing purpose selection screen displayed on the host computer 101 (step S1705), the host computer 101 designates the printing purpose and acquires a restriction ticket from the authentication server 102 (step S1706). In step S1705, the user selects the printing purpose from a list of printing purposes by operating a pointing device or the like. However, in an embodiment, the selection of a printing purpose may be performed automatically in accordance with an instruction for a print file by determining whether the name of the file resembles the name of the printing purpose. The printing purpose may be transmitted as job information to the printing apparatus 103. In this case, after printing processing of the job is completed, the printing apparatus 103 may transmit the printing purpose as a job history to a history management apparatus. Accordingly, an administrator is able to control the printing purpose. Thus, in terms of fear of consequences, users do not designate a particular printing purpose for an inappropriate document to perform printing.

In the first embodiment, the printing purpose selection screen is displayed, via a printer driver, on a display device. In addition, the printing purpose selection screen is displayed via the printer driver by acquiring a format restriction table, which represents format restrictions for individual printing purposes, acquired from the authentication server 102.

However, a printing purpose selection screen created in another information processing apparatus by an administrator or the like using utility software may be uploaded to the host computer 101 and stored in the external storage device provided in the host computer 101. Thus, the printing purpose selection screen can be displayed as shown in FIG. 7. In the first embodiment, any combination of a printing purpose and a permitted printing format can be provided in accordance with a request from the administrator.

In addition, a high-versatility printing purpose may be easily selected by setting a common printing purpose in advance.

In accordance with printing format restriction information described in the restriction ticket, a printing format setting dialog in which a restriction is provided for the display device of the host computer 101 is displayed via the printer driver (step S1707). In the first embodiment, the case where the host computer 101 acquires a restriction ticket from the authentication server 102 when printing format restriction information is stored in the external storage device of the authentication server 102 has been described. However, the printing format restriction information may be acquired from the authentication server 102 and stored in the external storage device of the host computer 101. In this case, processing for acquiring a restriction ticket from the authentication server 102 is not performed every time a printing request is received. Thus, the processing load of the authentication server 102 can be reduced.

The restriction ticket is held as a format restriction table, which represents format restrictions for individual printing purposes, that controls a permitted format (or inhibited format) for each printing purpose in the external storage device of the authentication server 102 or the host computer 101.

In the restriction ticket, a user or a user group that can select a corresponding purpose may be set.

In addition, as the printing format setting in which a restriction is provided for the display device, for example, printing methods other than 4-up printing and 6-up printing are displayed in gray or are not displayed so that only the 4-up printing and the 6-up printing can be selected, although the number of pages per sheet should be originally sequentially incremented by one, such as one page per sheet, two pages per sheet, and so on.

The user designates a printing format (step S1708), and gives an instruction to start printing (step S1709). The restriction ticket is embedded in print job data, and a secure print job is generated (step S1710). The generated secure print job is transmitted to the printing apparatus 103 (step S1711).

The printing apparatus 103 receives the print job (step S1712), and verifies the restriction ticket added to the print job (step S1713). If the restriction ticket is valid, the printing apparatus 103 performs printing in accordance with the printing format restriction information included in the restriction ticket (step S1714).

If the restriction ticket is invalid, the printing apparatus 103 cancels printing. The above-mentioned processing will be described later.

Figures 3, 4:
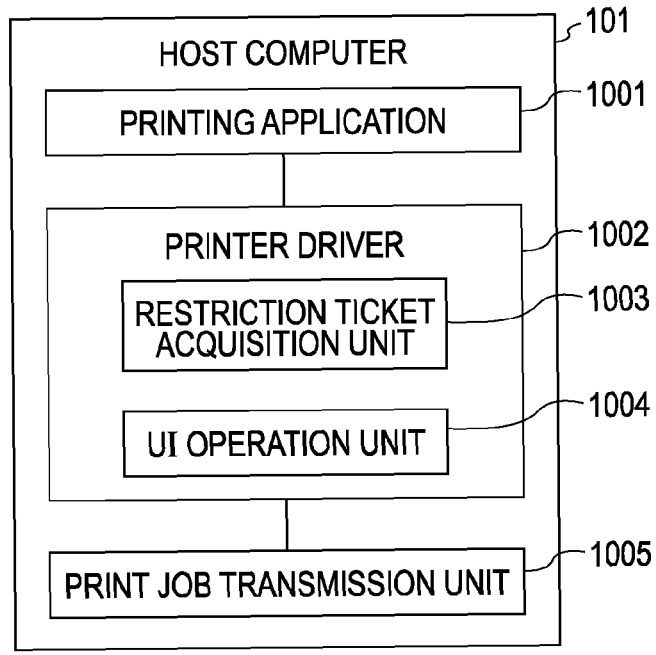
FIG. 3 is a block diagram showing a detailed configuration of a host computer shown in FIG. 1 according to an embodiment of the present invention.
FIG. 4 shows an example of a format restriction table, which represents printing formats for individual printing purposes, that stores printing formats selectable for individual printing purposes and that is held in the authentication server shown in FIG. 1.

FIG. 3 is a block diagram showing a detailed configuration of the host computer 101 shown in FIG. 1 according to an embodiment of the present invention.

Referring to FIG. 3, a printing application 1001 issues a printing instruction by transmitting an image-drawing command or the like to a printer driver 1002.

The printer driver 1002 may be installed in a hard disk or the like (not shown) by recognizing the printing apparatus 103 or may be downloaded and installed by access to the server apparatus by the user. Alternatively, the printer driver 1002 may be installed by being read from a compact disc ROM (CD-ROM) or the like.

The printer driver 1002 converts an image-drawing command or the like received from the printing application into print data that can be interpreted by the printing apparatus 103, that is, into a page description language (PDL). The print data is transmitted as a print job to a print job transmission unit 1005.

A user interface (UI) operation unit 1004 displays user interfaces for selecting a printing purpose and for setting a printing format on the display device (not shown).

In an embodiment, a restriction ticket acquisition unit 1003 operates as an internal module of the printer driver 1002. The restriction ticket acquisition unit 1003 passes to the authentication server 102 authentication information of a user who has given a printing instruction by operating the printing application 1001, and acquires a printing purpose that can be selected by the user. The restriction ticket acquisition unit 1003 also acquires a restriction ticket in which the user and printing format restriction information for the printing purpose selected by the user are described and a digital signature for the restriction ticket. The restriction ticket acquisition unit 1003 acquires the restriction ticket and the signature data for the user and adds the acquired restriction ticket and signature data to a print job.

The print job transmission unit 1005 receives the print job from the printer driver 1002, and transmits the print job to the printing apparatus 103.

The external storage device of the host computer 101 shown in FIG. 3 has a function to hold print history information including a print job transferred to the printing apparatus 103. The print history information is compressed and held in the external storage device. In addition, the print history information may be encoded, and the encoded print history information may be held in the external storage device.

Instead of causing the print history information including printing purpose information to be held in the external storage device of the host computer 101, the print history information may be transferred to the external storage device of the authentication server 102 or a file server and held in the external storage device.

Accordingly, an administrator is able to know a printing purpose of each user and presence/absence of violation of a printing restriction by referring to the stored print history information, thus preventing unauthorized use by the user.

FIG. 4 shows an example of a format restriction table representing format restrictions for individual printing purposes. The format restriction table represents printing formats that can be selected for individual printing purposes held in the authentication server 102 shown in FIG. 1.

Referring to FIG. 4, printing purposes are provided as entry words in rows 211, 212, and 213. In addition, the names of printing purposes are shown in a column 201, and permitted printing formats are shown in a column 202.

In the column 202, with respect to duplex/single-sided printing, N-up printing, and color/monochrome printing, set values permitted for individual printing purposes are shown. However, other printing formats can be shown.

A printing purpose, which is "material for division meeting", is shown in the row 211. For the printing purpose of "material for division meeting", monochrome printing, duplex printing, and 2-up and 4-up printing are permitted.

In contrast, for the printing purpose of "material for division meeting", color printing, single-sided printing, and 1-up printing are inhibited.

FIG. 5 shows an example of a printing purpose table representing printing purposes of individual users. The printing purpose table represents printing purposes that can be selected by individual users held by the authentication server 102 shown in FIG. 1.

Referring to FIG. 5, users or user groups are provided as entry words in rows 311 to 313. The names of users or the names of user groups are shown in a column 301, and printing purposes that can be selected by individual users or individual members of user groups are shown in a column 302.

The numbers of available times of individual printing purposes are shown in a column 303, and the numbers of times individual users or individual members of user groups have used corresponding printing purposes are shown in a column 304. In addition, the numbers of printable pages for individual users or individual members of user groups when corresponding printing purposes are designated are shown in a column 305. For example, values in the row 311 represent that a user whose name is "kato" is able to select printing purposes, "material for division meeting" and "clerical document".

In addition, values in a row 311-1 represent that the user "kato" is able to use the printing purpose "material for division meeting" ten times and that the user "kato" has already used the printing purpose "material for division meeting" five times. The values in the row 311-1 also represent that the user "kato" is able to print another "100" pages when designating the printing purpose "material for division meeting".

In order to log onto the host computer 101, a user enters a user name and a password.

When the user gives a printing instruction using the printing application 1001, the restriction ticket acquisition unit 1003 acquires from the host computer 101 a user name corresponding to the logged-in user who issued the printing instruction. The user name is transmitted to the authentication server 102 via the network. The authentication server 102 checks for the user name in the printing purpose table shown in FIG. 4, and transmits a list of printing purposes that can be selected by the user.

As shown in FIG. 5, a printing purpose in which the number of available times shown in the column 303 is equal to the number of times used shown in the column 304 and a printing purpose in which the number of printable pages shown in the column 305 is 0 or less are deleted from the list of printing purposes that can be selected by the user shown in FIG. 5.

The restriction ticket acquisition unit 1003 receives the list of printing purposes that can be selected by the user, and transmits the list of printing purposes to the UI operation unit 1004. Thus, the UI operation unit 1004 displays a user interface to be used by the user to select a printing purpose on the display device of the host computer 101.

In this example, a printing purpose that can be selected by each user is stored. However, the name of a user who is able to select each printing purpose may be stored.

FIG. 6 shows an example of a user group table representing members belonging to individual user groups held in the authentication server 102 shown in FIG. 1.

Referring to FIG. 6, the names of user groups are shown in a column 2201, and the names of users belonging to the corresponding user groups are shown in a column 2202.

The user groups are provided as entry words in rows 2211 and 2212. A user group named as "Sales" is provided as an entry word in the row 2211. The user group "Sales" includes "sato" and "machida" as members.

In this example, the names of members who belong to each user group are stored. However, the name of a user group to which each user belongs may be stored.

The authentication server 102 refers to the printing purpose table shown in FIG. 5 and the user group table shown in FIG. 6 in order to retrieve a printing purpose that can be used by a user or a user group to which a user belongs. If a user belongs to a plurality of groups, the logical OR of printing purposes of the plurality of groups is performed and the resulting list of printing purposes selectable by the user is displayed.

FIG. 7 shows an example of a user interface used for selecting a printing purpose and displayed by the UI operation unit 1004 shown in FIG. 3.

In the dialog shown in FIG. 7 for selecting a printing purpose, "material for division meeting" or "clerical document" can be selected as a printing purpose. When the user selects "material for division meeting" or "clerical document" and then presses an "OK" button B1, the printing purpose is determined.

The UI operation unit 1004 passes the selected printing purpose to the restriction ticket acquisition unit 1003.

The restriction ticket acquisition unit 1003 sends the selected printing purpose and the user name to the authentication server 102, and requests the authentication server 102 to issue a restriction ticket. The authentication server 102 increments by one the corresponding value in the column 304 of the number of times the user has used the printing purpose in the printing purpose table shown in FIG. 5.

Then, the authentication server 102 refers to the printing format restriction table shown in FIG. 4 to acquire information on a printing format permitted for the received printing purpose. The authentication server 102 generates a restriction ticket, and transmits the generated restriction ticket to the host computer 101.

For example, when the user "kato" selects "material for division meeting" as a printing purpose, a restriction ticket in which "duplex printing", "2-up printing", "4-up printing", and "monochrome printing" are permitted as printing formats is acquired.

If the user belongs to a plurality of groups, after one of the plurality of groups is selected, a printing purpose is selected.

FIG. 8 shows an example of a form of a restriction ticket generated by the authentication server 102.

Referring to FIG. 8, reference numeral 401 denotes a printing purpose (PURPOSE) selected by the user. Reference numeral 402 denotes the user name (USERNAME) of the user who has issued the print job. Reference numeral 403 denotes a restriction form (STRICT_DUPLEX) representing compulsory execution of duplex printing. A setting value "TRUE" represents that only duplex printing is permitted. On the contrary, a setting value "FALSE" represents that both duplex printing and single-sided printing are permitted.

Reference numeral 404 denotes a restriction form (STRICT_NUP) relating to N-up printing. As a setting value, the number of printable pages per sheet is shown. In the example shown in FIG. 8, 2-up printing and 4-up printing are permitted.

Reference numeral 405 denotes a restriction form (STRICT_COLOR) relating to color printing. A setting value "TRUE" represents that color printing is not permitted. On the contrary, a setting value "FALSE" represents that both monochrome printing and color printing are permitted.

The above-mentioned example is merely an example of a restriction ticket. For example, restriction information relating to a staple function can also be described in the restriction ticket.

Reference numeral 406 denotes the maximum number of pages to be output for the corresponding print job. The value "=100" indicates that the maximum number of pages to be output for the print job is 100.

Figure 16:
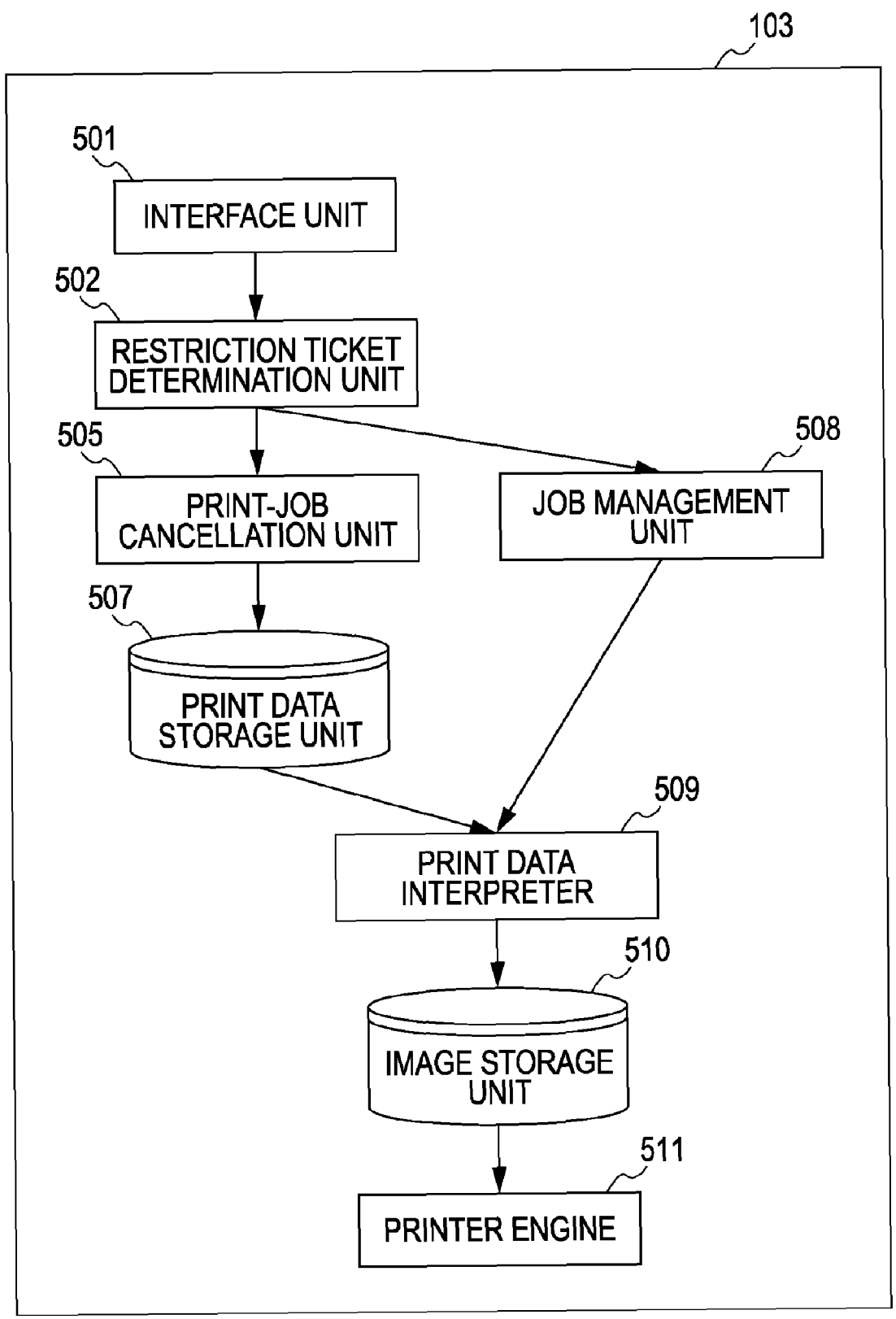
FIG. 16 is a block diagram showing a detailed configuration of the printing apparatus shown in FIG. 1 according to an embodiment of the present invention.

Restriction information on the printing formats described in the restriction ticket affects an operation of a print data interpreter 509 shown in FIG. 16, and any command based on PDL data that violates the above-mentioned restrictions is unauthorized. Thus, the restriction ticket affects a printing result.

In addition, in order to verify whether the restriction ticket has been issued from the authorized authentication server 102, verification using a digital signature is implemented.

The UI operation unit 1004 of the printer driver 1002 displays a printing format setting screen shown in FIG. 9 in response to a user operation.

Figure 10:
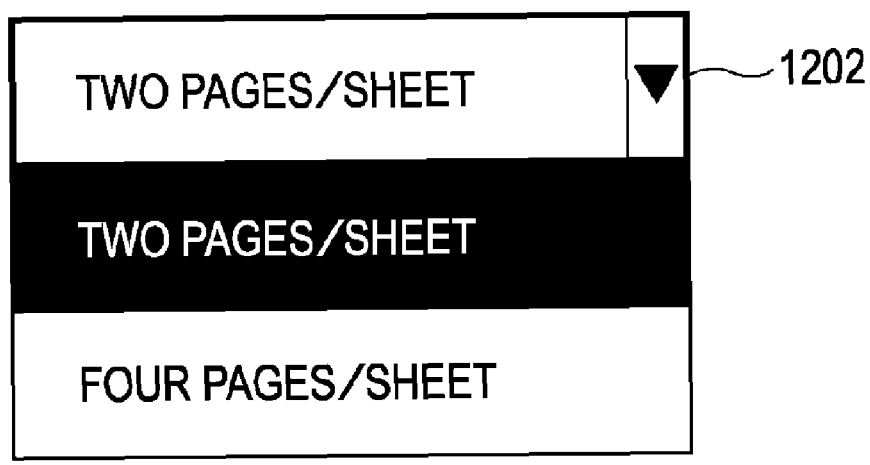
FIG. 10 shows an example of a printing format setting screen displayed by the UI operation unit shown in FIG. 3.
Figure 11:
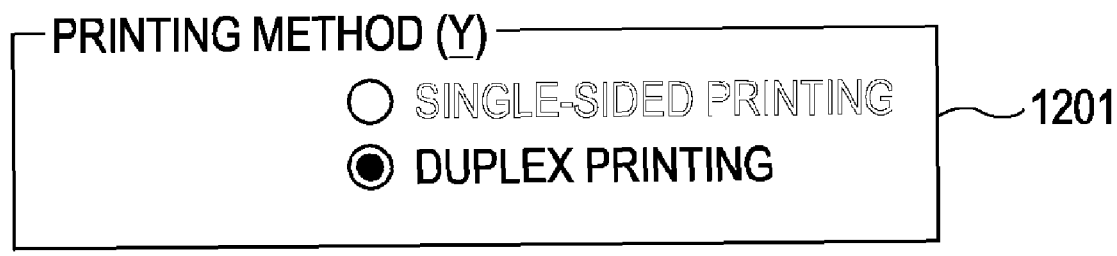
FIG. 11 shows an example of the printing format setting screen displayed by the UI operation unit shown in FIG. 3.

FIGS. 9 to 11 show examples of a printing format setting screen displayed by the UI operation unit 1004 shown in FIG. 3. Selectable items displayed in the printing format setting screen are different in accordance with a function of the printing apparatus 103 and an optional device. FIG. 10 shows, in accordance with a displayed form, a principal portion of a control shown in FIG. 9 for setting N-up printing.

Referring to FIG. 9, reference numeral 1201 denotes a control for setting single-sided printing or duplex printing. When a radio button RB1 or RB2 is selected, single-sided printing or duplex printing can be set.

Reference numeral 1202 denotes a control for setting N-up printing. Reference numeral 1203 denotes a control for selecting an order of arrangement of logical pages in N-up printing.

Reference numeral 1204 denotes a control for setting color printing or monochrome printing.

When displaying the printing format setting screen shown in FIG. 9, the UI operation unit 1004 refers to the printing format restriction information included in the restriction ticket and displays an inhibited printing format setting so as not to be selectable.

FIG. 10 shows an example of the N-up printing setting control 1202. The N-up printing setting control 1202 is provided in the form of a drop-down list box. In the drop-down list, only setting values permitted by the corresponding restriction ticket are displayed. Thus, in the example of the display shown in FIG. 10, a screen is provided such that only 2-up printing or 4-up printing can be selected.

FIG. 11 shows an example of the single-sided/duplex printing setting control 1201. The single-sided/duplex printing setting control 1201 is provided in the form of a radio button. In this example, "single-sided printing", which is restricted by the restriction ticket, is displayed in a pale color (for example, gray) such that the single-sided printing cannot be selected.

The printing format setting screen is displayed when the user of the host computer 101 operates an input device, such as a pointing device. Printing can be started without displaying the printing format setting screen.

When printing is started without displaying the printing format setting screen, printing format settings set in advance in the printer driver 1002 may violate the printing format restrictions set by the restriction ticket.

In this case, the printer driver 1002 automatically changes the printing format settings such that the printing format settings fall in a range of the printing format restrictions set by the restriction ticket. Alternatively, a warning (not shown) may be indicated on the display unit of the host computer 101 to cause the user to change the settings.

A form of a print job generated by the printer driver 1002 shown in FIG. 3 is described next.

In the first embodiment, a print job includes one or more job packets normalized such that recognition of start and end of the print job and setting of the attributes of the print job can be easily performed.

Figure 12:
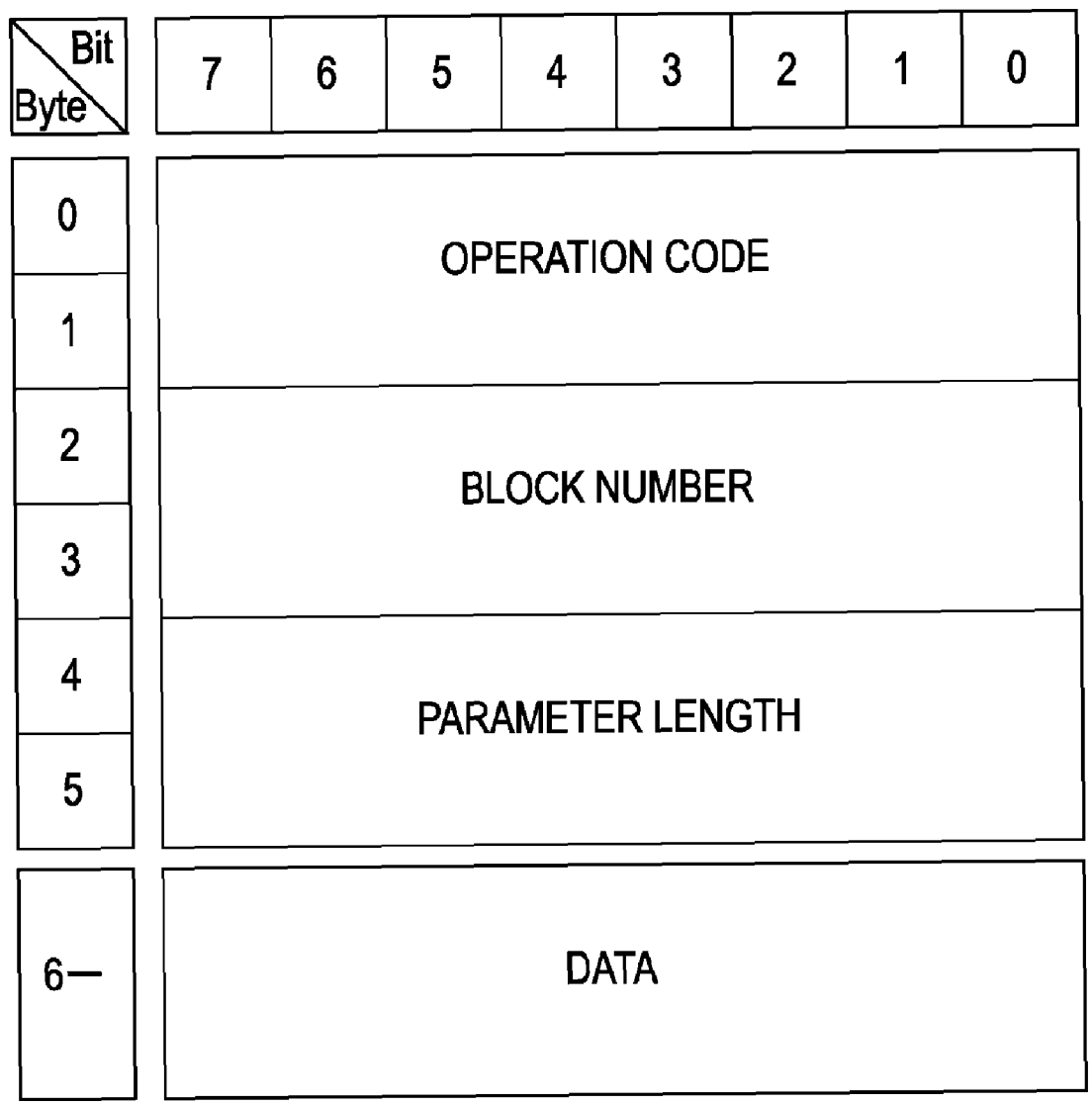
FIG. 12 shows a configuration of a job packet generated by a printer driver shown in FIG. 3 according to an embodiment of the present invention.

FIG. 12 shows a configuration of a job packet generated by the printer driver 1002 shown in FIG. 3 according to an embodiment of the present invention.

Referring to FIG. 12, the axis of ordinate represents a byte and the axis of abscissa represents a bit in each byte.

In FIG. 12, operation code in the 0th to 1st bytes indicates an ID having a two-byte length and representing a function of the packet. In the job packet, values described below can be set.

Here, a value "0x0201" indicates a job start operation, and a value "0x0202" indicates a job attribute setting operation.

A value "0x0204" indicates a PDL data transmission operation. A value "0x0205" indicates a job end operation. A value "0x0301" indicates a restriction information operation.

A block number in the 2nd to 3rd bytes is used for obtaining a correspondence between a response request that has been transmitted from a job-packet transmitter and a response transmitted from a job-packet receiver.

For example, when job packets having block numbers of 1, 2, and 3 are continuously transmitted and an error packet of a block number of 2 is returned, the job-packet transmitter is able to identify that an error has occurred in the second transmitted job packet.

A parameter length in the 4th to 5th bytes indicates the byte length of a data portion. A byte length from 0 to 64 Kbytes can be expressed.

Data corresponding to operation code is stored in the sixth byte and the subsequent bytes. When the job start operation or the job end operation is indicated, no data exists.

When the job attribute setting operation is indicated, a job attribute ID and a job attribute value to be set are stored in a data portion.

The job attribute ID indicates an identifier provided in accordance with an attribute or environment for a job. An ID corresponding to the attribute of a job defined by ISO-10175 (DPA) ((ISO): International Organization for Standardization) is allocated in advance. Typical job attribute IDs are given below.

As a job attribute ID, "0x0101" indicates the name of a job. As a job attribute ID, "0x0103" indicates the name of a job owner.

As a job attribute ID, "0x016a" indicates the size of a job. As a job attribute ID, "0x0174" indicates the number of print pages.

In accordance with a function of the printing apparatus 103, a print job ID for a client, job attributes, such as the number of print copies, monochrome printing/color printing, and single-sided printing/duplex printing, and corresponding IDs can be allocated.

Figure 13:
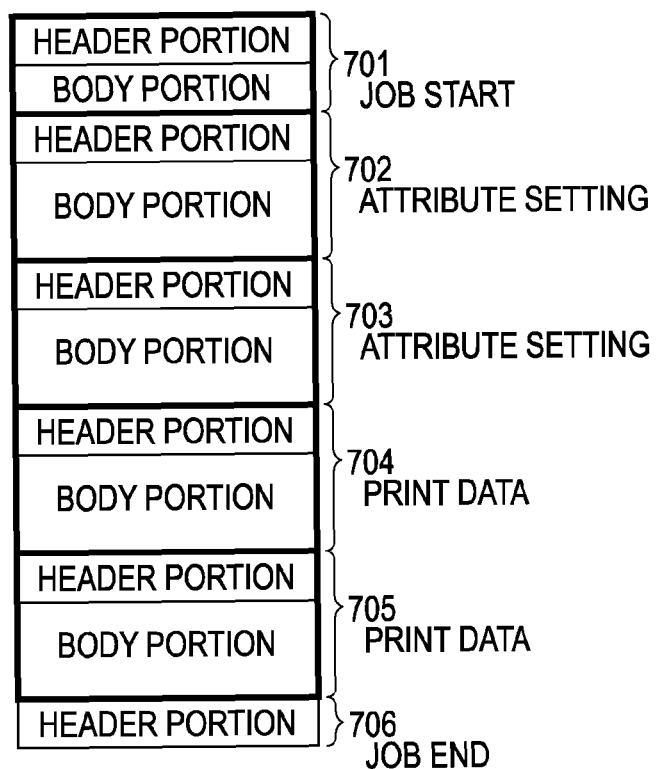
FIG. 13 shows a configuration of a print job generated by the printer driver shown in FIG. 3 according to an embodiment of the present invention, in which restriction information is not provided.
Figure 14:
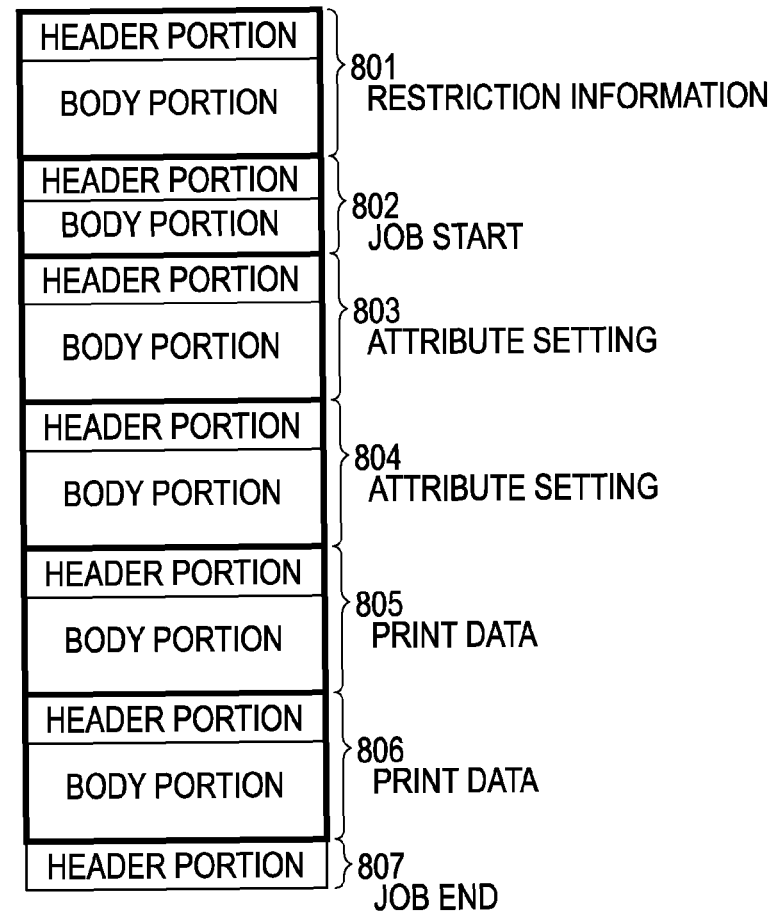
FIG. 14 shows a configuration of a print job generated by the printer driver shown in FIG. 3 according to an embodiment of the present invention, in which restriction information is provided.

FIGS. 13 and 14 show configurations of print jobs generated by the printer driver 1002 shown in FIG. 3 according to an embodiment of the present invention. For the sake of explanation, FIG. 13 shows an example of a simplified configuration of a print job in a form of the related art in which restriction information is not provided. FIG. 14 shows an example of a configuration of a print job used in the first embodiment.

Referring to FIG. 13, job packets are sequentially transmitted from the host computer 101 to the printing apparatus 103 in the order from the top to the bottom. A header portion in each of the packets indicates a fixed region from the 0th to 5th bytes shown in FIG. 6, and a body portion in each of the packets indicates a data portion in the 6th byte and the subsequent bytes.

The print job includes a job packet 701 that indicates the start of the job. The contents of the job packet 701 can be understood in accordance with the operation code "0x0201" in the 0th to 1st bytes, which indicates the job start operation.

Job packets 702 and 703 are attribute settings for setting the name of the job, the name of the job owner, the print job ID for the client, printing conditions, and the like. The contents of the job packets 702 and 703 can be understood in accordance with the operation code "0x0202" in the 0th to 1st bytes, which indicates the attribute setting operation. If a plurality of attributes is to be set, as shown in FIG. 13, a plurality of job packets for setting attributes is provided.

Job packets 704 and 705 are job packets for transmitting print data. The contents of the job packets 704 and 705 can be understood in accordance with the operation code "0x0204" in the 0th to 1st bytes, which indicates the PDL data transmission operation. A job packet 706 indicates the end of the job.

Similarly, if a plurality of PDL data transmission operations is to be performed, a plurality of job packets for PDL data transmission is provided.

For the sake of explanation, FIG. 14 shows an example of a simplified configuration of a print job in which restriction information is provided.

In FIG. 14, a job packet indicating restriction information 801 is added at the beginning of the print job shown in FIG. 13.

The contents of the restriction information 801 can be understood in accordance with the operation code "0x0301" in the 0th to 1st bytes, which indicates the restriction information operation. Restriction information is described in a data portion of the job packet for which the restriction information operation is designated.

The print job includes a job packet 802 that indicates the start of the job. The contents of the job packet 802 can be understood in accordance with the operation code "0x0201" in the 0th to 1st bytes, which indicates the job start operation.

Job packets 803 and 804 are attribute settings for setting the name of the job, the name of the job owner, the print job ID for the client, printing conditions, and the like. The contents of the job packets 803 and 804 can be understood in accordance with the operation code "0x0202" in the 0th to 1st bytes, which indicates the attribute setting operation.

Job packets 805 and 806 are job packets for transmitting print data. The contents of the job packets 805 and 806 can be understood in accordance with the operation code "0x0204" in the 0th to 1st bytes, which indicates the PDL data transmission operation. A job packet 807 indicates the end of the job.

Figure 15:
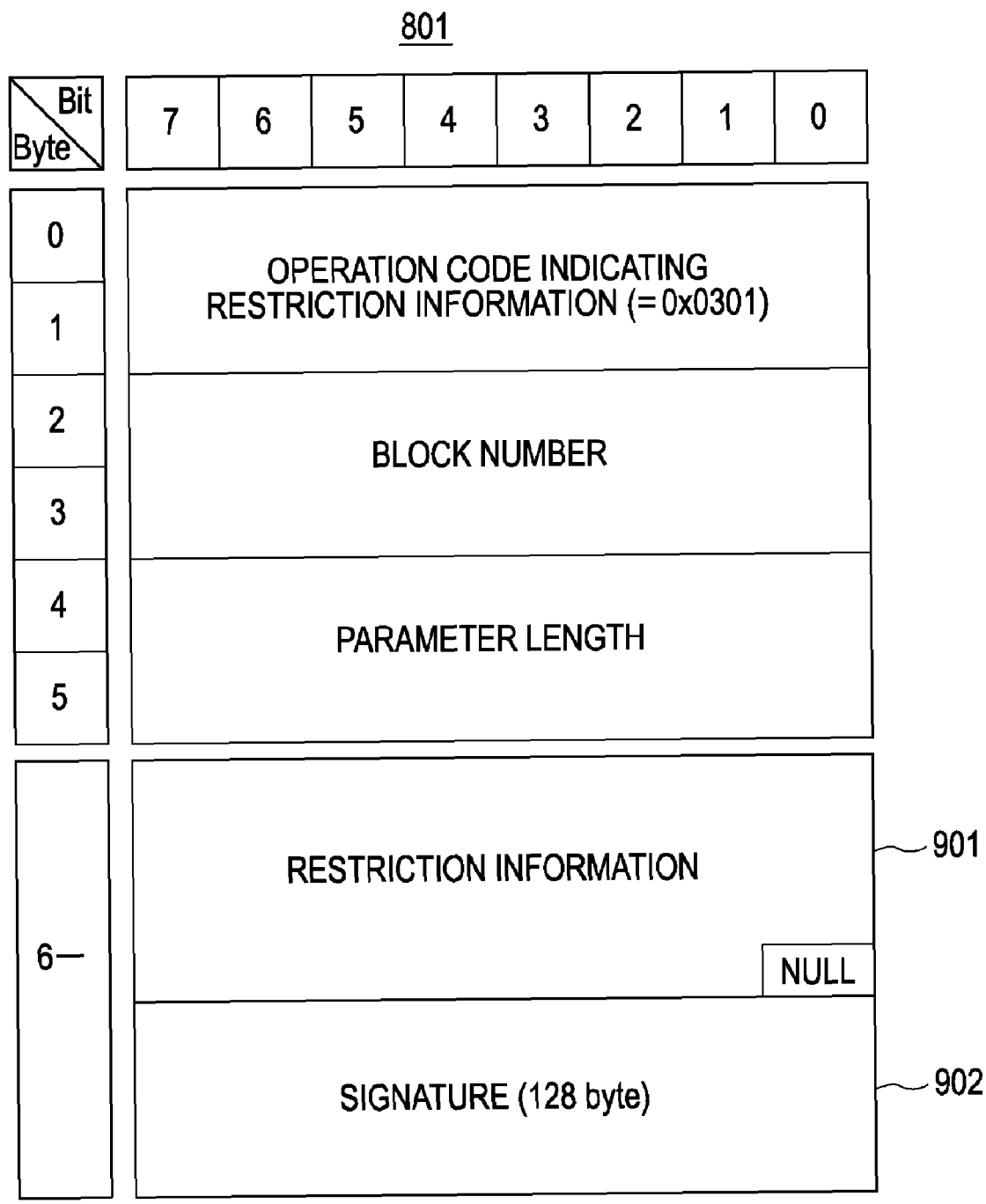
FIG. 15 shows a job packet indicating restriction information shown in FIG. 14 according to an embodiment of the present invention.

FIG. 15 shows the job packet indicating the restriction information 801 shown in FIG. 14 according to an embodiment of the present invention.

Referring to FIG. 15, a region from the 0th to 5th bytes is a header region and a region from the 6th byte and the subsequent bytes is a data region. A region 901 from the beginning to a NULL character indicates restriction information. The information shown in FIG. 9 is written as the restriction information.

A region 902 of 128 bytes after the NULL character indicates a digital signature. The digital signature ensures that the restriction information 801 has been issued from the authorized authentication server 102 and that the restriction information 801 has not been falsely rewritten in the middle of process.

The digital signature in the region 902 is generated by the authentication server 102 when the restriction ticket is issued, and the generated digital signature is transmitted to the printer driver 1002.

In general, digital signatures are based on, for example, the Rivest-Shamir-Adleman (RSA) public-key cryptosystem. When a digital signature based on the public-key system is used, a digest based on a one-way function is generated from a target of the signature (in this case, restriction information). Then, the digest is encoded using a private key owned by an issuer (in this case, the authentication server 102), and verification of the signature is performed using a public key by the printing apparatus 103.

Only an authorized authentication server holds the private key. Thus, if the verification of the signature using the authorized public key is achieved, the validity of the target of the signature can be confirmed.

A pair of public keys held by the authentication server 102 is used for the digital signature. The pair of public keys is transmitted from the authentication server 102 to the printing apparatus 103 prior to printing. Regarding a passing procedure, when a network is used, third-party authentication using a public-key infrastructure (PKI), physical distribution using a memory card, or the like is considered. A known procedure can be used as the passing procedure. Since such a procedure is not relevant to the principle of this embodiment, detailed explanations will be omitted.

FIG. 16 is a block diagram showing a detailed configuration of the printing apparatus 103 shown in FIG. 1 according to an embodiment of the present invention.

Referring to FIG. 16, an interface unit 501 is connected to the network 104. The interface unit 501 receives a print job from a print system. A restriction ticket determination unit 502 identifies the form of the received print job and determines whether a restriction ticket is provided in the print job.

A print-job cancellation unit 505 issues an instruction to cancel printing of a print job in which a restriction ticket is not provided. A print data storage unit 507 temporarily stores print data included in the print job, that is, PDL data.

A job management unit 508 analyzes the print job, controls output attribute information on color and the like, stores the PDL data in the print data storage unit 507, and controls the print job.

The print data interpreter 509 acquires the print data from the print data storage unit 507 to perform image generation processing and generates image data in accordance with the attribute information stored in the job management unit 508.

An image storage unit 510 temporarily stores the image data generated by the print data interpreter 509 until completion of printing. A printer engine 511 actually prints the image data stored in the image storage unit 510 on a medium, such as a print sheet, using a known printing technology, such as the electrophotographic technology or the inkjet technology.

The print data storage unit 507 and the image storage unit 510 may be two-dimensional storage devices, such as high-capacity hard disks. However, the physical configurations of the print data storage unit 507 and the image storage unit 510 are not particularly limited.

Processing of the printing apparatus 103 to receive a print job transmitted from the host computer 101 is described next.

Figure 17:
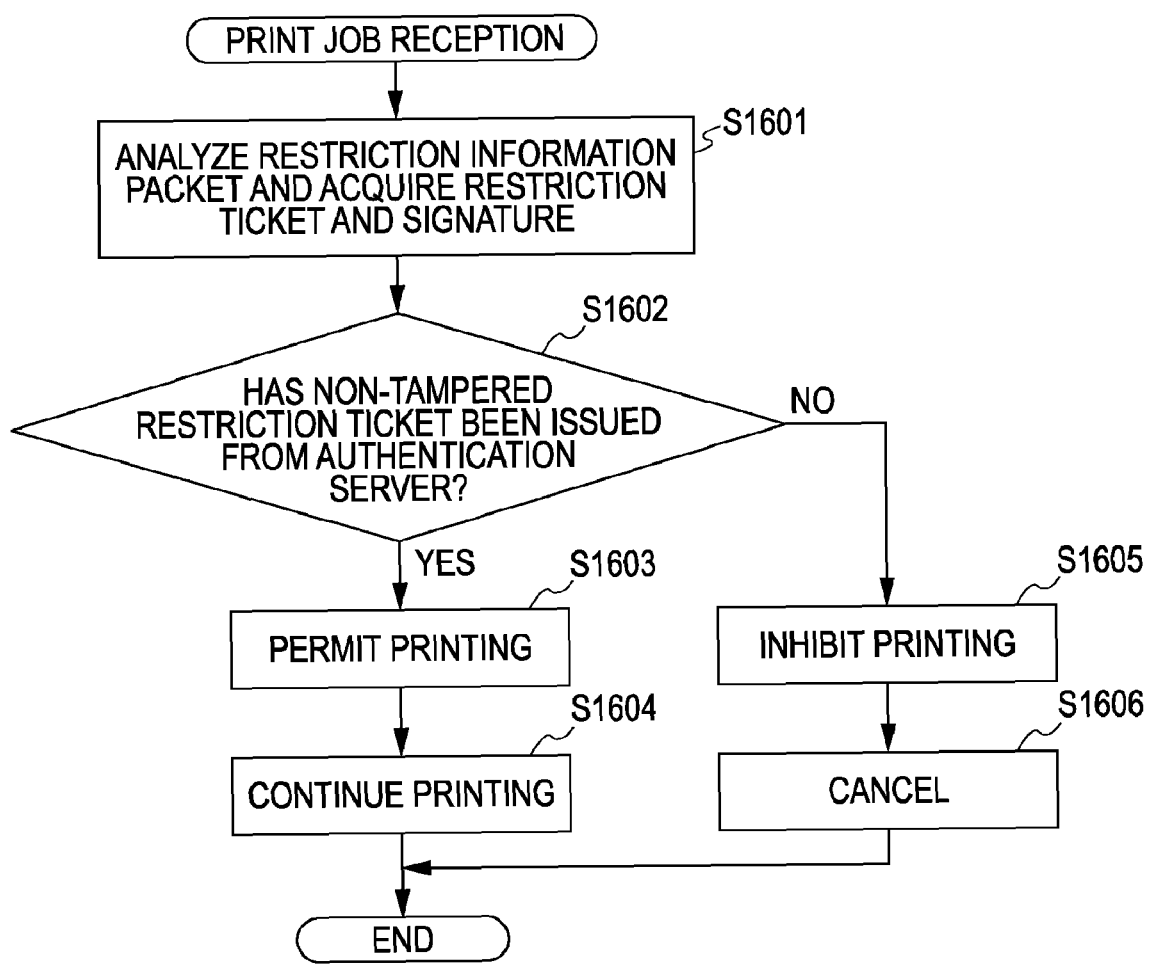
FIG. 17 is a flowchart showing an example of a first data processing process performed by the printing apparatus according to an embodiment of the present invention.

FIG. 17 is a flowchart showing an example of a first data processing process performed by the printing apparatus 103 according to the first embodiment. This process is an example of a print job reception process performed by the restriction ticket determination unit 502 shown in FIG. 16. Processing of steps S1601 to S1606 is realized when the CPU of the printing apparatus 103 loads a control program to the RAM and executes the control program.

The restriction ticket determination unit 502 starts the operation when the printing apparatus 103 starts, and continues the operation until the power of the printing apparatus 103 is turned off.

In step S1601, the restriction ticket determination unit 502 receives print job packets from the interface unit 501, identifies operation code, and acquires a job packet indicating a restriction information operation whose operation code is "0x0301". The restriction ticket determination unit 502 acquires a restriction ticket and a digital signature of the restriction ticket.

Then, in step S1602, the restriction ticket determination unit 502 verifies the restriction ticket and the digital signature of the restriction ticket. The restriction ticket determination unit 502 determines whether the restriction ticket has been issued by the authorized authentication server 102 and has not been tampered. If it is determined that the verification is successfully performed, the process proceeds to step S1603 to determine that printing is permitted. Then, in step S1604, printing is continued, and the processing is terminated.

In contrast, if it is determined in step S1602 that the verification is not successfully performed, the process proceeds to step S1605 to determine that printing is not permitted. Then, in step S1606, printing is cancelled, and the processing is terminated.

The operation of the job management unit 508 shown in FIG. 16 is described next with reference to a flowchart shown in FIG. 18.

Figure 18:
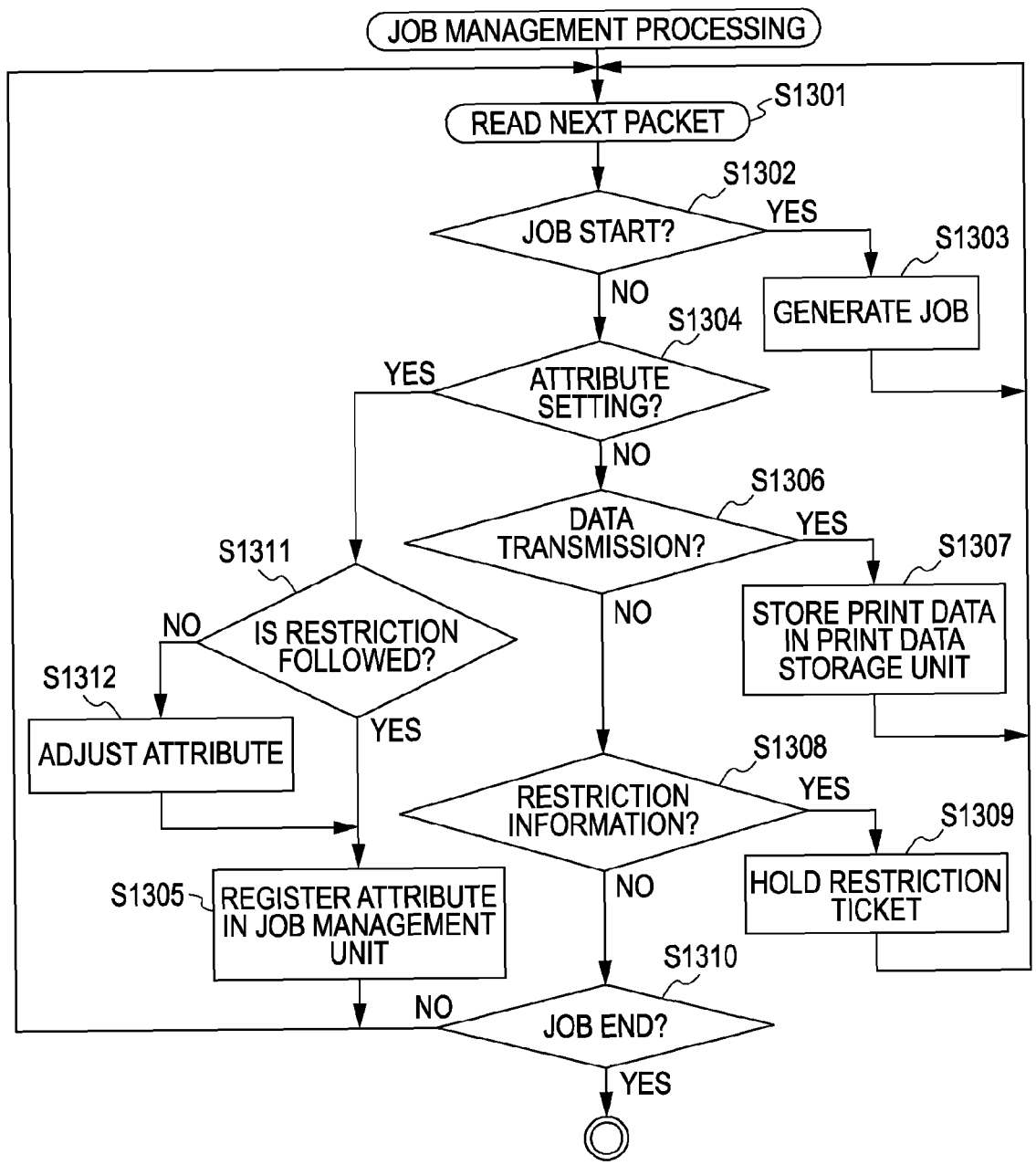
FIG. 18 is a flowchart showing an example of a second data processing process performed by the printing apparatus according to an embodiment of the present invention.

FIG. 18 is a flowchart showing an example of a second data processing process performed by the printing apparatus 103 according to the first embodiment. This process is an example of a print job process performed by the job management unit 508 shown in FIG. 16. Processing of steps S1301 to S1312 is realized when the CPU of the printing apparatus 103 loads a control program and executes the control program.

In step S1301, the job management unit 508 sequentially reads packets of a print job.

In step S1302, the jog management unit 508 determines whether operation code (OPC) of a read job packet indicates the job start operation "0x0201". If the job management unit 508 determines that the operation code indicates the job start operation "0x0201", the process proceeds to step S1303 to cause the job management unit 508 to generate on the RAM an area in which print job information is stored. Then, the process returns to step S1301.

In contrast, if the job management unit 508 determines in step S1302 that the OPC of the read job packet does not indicate the job start operation "0x0201", the process proceeds to step S1304.

In step S1304, the job management unit 508 determines whether the OPC of the read job packet indicates the job attribute setting operation "0x0202". If the job management unit 508 determines in step S1304 that the OPC of the read job packet indicates the job attribute setting operation "0x0202", the process proceeds to step S1311.

In step S1311, the job management unit 508 determines whether printing setting designated by the job attribute setting operation follows a printing format restriction set in the restriction ticket. If the job management unit 508 determines that the printing setting follows the printing format restriction, the process proceeds to step S1305 to set attribute information in the area of the job management unit 508 in which the corresponding print job information is stored. Then, the process returns to step S1301.

In contrast, if it is determined in step S1311 that printing setting violates the printing format restriction, the process proceeds to step S1312 to change the printing setting to a value permitted in the restriction ticket. Then, the process proceeds to step S1305.

For example, when 1-up printing is inhibited and 2-up printing and 4-up printing are permitted in the restriction ticket, if 1-up printing is designated in the attribute setting operation, 2-up printing, which is close to the printing setting set in the attribute setting operation, is set.

In contrast, if the job management unit 508 determines in step S1304 that the OPC of the read job packet does not indicate the job attribute setting operation "0x0202", the process proceeds to step S1306.

In step S1306, the job management unit 508 determines whether the OPC of the read job packet indicates the PDL data transmission operation "0x0204". Here, if the job management unit 508 determines that the OPC of the read job packet indicates the PDL data transmission operation "0x0204", the process proceeds to step S1307.

In step S1307, PDL data is stored in the print data storage unit 507. Then, the process returns to step S1301.

In contrast, if the job management unit 508 determines in step S1306 that the OPC of the read job packet does not indicate the PDL data transmission operation "0x0204", the process proceeds to step S1308. In step S1308, the job management unit 508 determines whether the OPC of the read job packet indicates the restriction information operation "0x0301". If the job management unit 508 determines in step S1308 that the OPC of the read job packet indicates the restriction information operation "0x0301", the process proceeds to step S1309.

In step S1309, the restriction ticket is stored in the area of the job management unit 508 in which the corresponding print job information is stored. Then, the process returns to step S1301.

In contrast, if the job management unit 508 determines in step S1308 that the OPC of the read job packet does not indicate the restriction information operation "0x0301", the job management unit 508 determines whether the OPC of the read job packet indicates the job end operation "0x0205" (step S1310). If the job management unit 508 determines that the OPC of the read job packet does not indicate the job end operation "0x0205", the process returns to step S1301. If the job management unit 508 determines that the OPC of the read job packet indicates the job end operation "0x0205", the operation of the print data interpreter 509 based on the restriction information starts.

The operation of the print data interpreter 509 performed in accordance with the restriction information is described next.

The print data interpreter 509 shown in FIG. 16 interprets a so-called PDL, and generates image data actually used for printing. As PDLs, various specifications, such as postscript and language interpretation and pronunciation service (LIPS), are realized.

Figure 19:
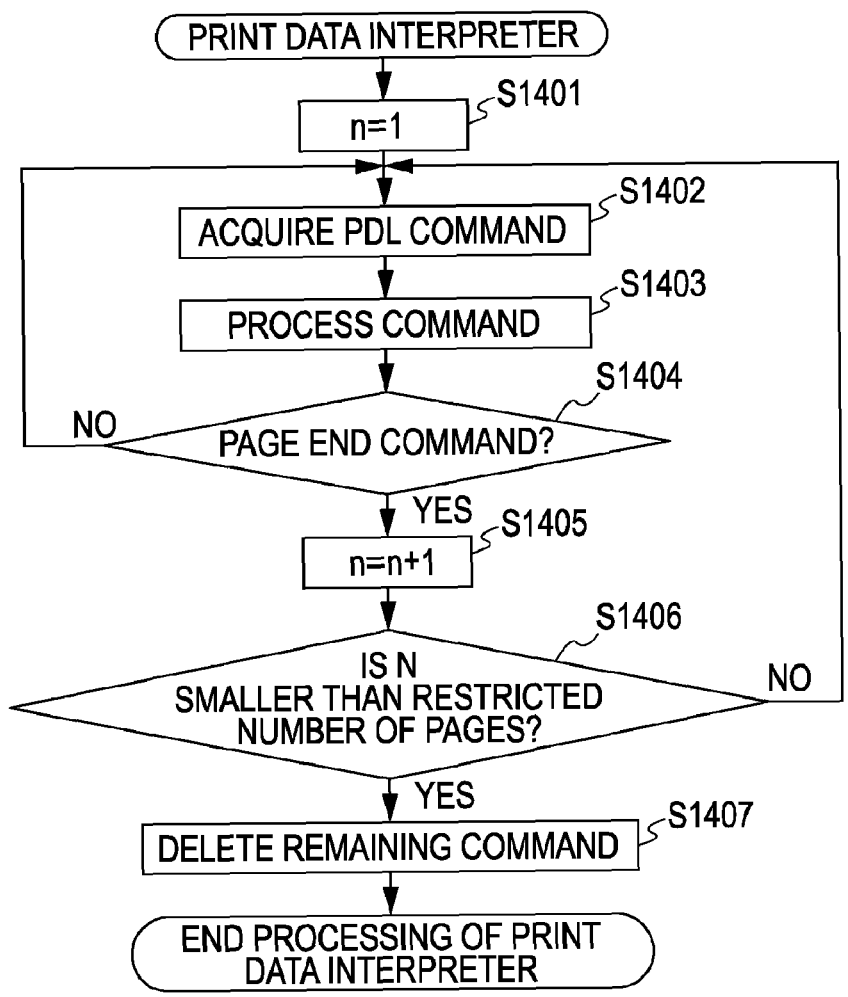
FIG. 19 is a flowchart showing an example of a third data processing process performed by the printing apparatus according to an embodiment of the present invention.

FIG. 19 is a flowchart showing an example of a third data processing process performed by the printing apparatus 103 according to the first embodiment. This process is an example of a print job analysis process performed by the print data interpreter 509 shown in FIG. 16. Processing of steps S1401 to S1407 is realized when the CPU of the printing apparatus 103 loads a control program to the RAM and executes the control program.

The print data interpreter 509 receives the print job, and continues processing until interpretation of the last page of the corresponding print job is completed.

In step S1404, a variable n, which represents a page number, is initialized to "1". Then, in step S1402, the print data interpreter 509 acquires a PDL command from the print data storage unit 507.

In step S1403, the print data interpreter 509 performs interpretation of the PDL command. Here, the PDL command is, for example, a command for actually drawing an image, such as "rectangle drawing" or "image drawing" in a LIPS language.

In step S1404, the print data interpreter 509 determines whether the command processed here is a page end command. If the print data interpreter 509 determines in step S1404 that the processed command is not a page end command, the process returns to step S1402.

In contrast, if the print data interpreter 509 determines in step S1404 that the processed command is a page end command, the print data interpreter 509 increments the variable n, which represents a page number, by one in step S1405.

In step S1406, the print data interpreter 509 determines whether the variable n exceeds the restricted number of pages in accordance with the restriction ticket set in step S1309 shown in FIG. 18. If the print data interpreter 509 determines that the variable n does not exceed the restricted number of pages, the process returns to step S1402.

In contrast, if the print data interpreter 509 determines that the variable n exceeds the restricted number of pages, all the remaining commands are deleted in step S1407. Then, the processing of the print data interpreter 509 is terminated.

For example, in the case of the print job shown in FIG. 15, since the maximum number of printable pages is 100, remaining data when a page end command of print data is detected 100 times is skipped, and printing is not performed.

After printing is completed, the print data interpreter 509 informs the job management unit 508 of the completion of the printing. The job management unit 508 deletes the area of the RAM (not shown) in which the print job information is stored. A print job history including the printing purpose set in the restriction ticket, the user name, the number of printed pages, and the like as well as information on the print job are stored in a nonvolatile memory. Thus, an administrator or the like is able to refer to the print job history later.

The job management unit 508 also informs the authentication server 102 of the completion of the print job, and reports to the authentication server 102 the printing purpose, the user name, and the number of printed pages. The authentication server 102 subtracts the number of printed pages from the number of printable pages for the corresponding printing purpose of the user.

As described above, in the first embodiment, a purpose is set for a print job. Since printing of the print job can be performed within a range of a printing format restriction for the associated purpose, user convenience is improved compared with a case where all the print jobs not satisfying a printing condition are canceled.

In the first embodiment, the maximum number of printable pages is set for each user and for each purpose. Thus, print histories are accumulated for each user and for each purpose. When the number of printed pages exceeds the maximum number of printable pages, printing is inhibited.

Processing for a print job not including restriction information is described next.

Figure 20:
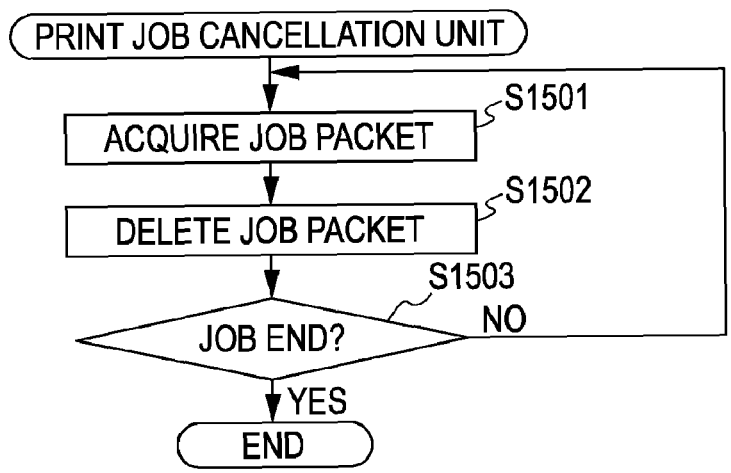
FIG. 20 is a flowchart showing an example of a fourth data processing process performed by the printing apparatus according to an embodiment of the present invention.

FIG. 20 is a flowchart showing an example of a fourth data processing process performed by the printing apparatus 103 according to the first embodiment. This process is an example of a print-job cancellation process performed by the print-job cancellation unit 505 shown in FIG. 16. Processing of steps S1501 to S1503 is realized when the CPU of the printing apparatus 103 loads a control program to the RAM and executes the control program.

The print-job cancellation unit 505 starts the operation when the printing apparatus 103 starts, and continues the operation until the power of the printing apparatus 103 is turned off.

If the restriction ticket determination unit 502 determines that a print job does not include restriction information, the print job is transferred to the print-job cancellation unit 505.

In step S1501, the print-job cancellation unit 505 acquires a job packet from the restriction ticket determination unit 502. In step S1502, the print-job cancellation unit 505 deletes the acquired job packet.

In step S1503, the print-job cancellation unit 505 determines whether the job is to be terminated. If the print-job cancellation unit 505 determines that the job is not to be terminated, the process returns to step S1501.

In contrast, if the print-job cancellation unit 505 determines that the job is to be terminated, the process is terminated.

As described above, for the user, for example, as printing format setting information on page layout, all the standard page layout items are not displayed on the printing setting screen provided by the printer driver 1002. That is, for each user who wants to output the print job, page layout items to be displayed are restricted. Thus, a problem in the related art can be solved.

In the first embodiment, the case where the restriction ticket acquisition unit 1003 acquires the printing format restriction information held in a holding unit provided in the authentication server 102 is described. However, with a configuration in which printing format restriction information is acquired from the authentication server 102 and held in the host computer 101 when the printer drive is installed in the host computer 101, the printing format restriction information may be acquired from a holding unit provided in the host computer 101.

Second Embodiment

In the first embodiment, the processing for receiving a print job from the host computer 101 and performing printing has been described. In a second embodiment, copying processing performed by the printing apparatus 103 is described.

A user performs a copy operation using a user interface (UI) operation unit 512 (not shown) for an operation unit (not shown) of the printing apparatus 103. The user inputs user information from the operation unit to the printing apparatus 103. Here, user authentication is performed. Then, as described above, a printing purpose is selected, a printing format is set, and copying is started.

Here, information representing a printing purpose is held in the external storage device provided in the printing apparatus 103. An administrator acquires printing format restriction information held in the host computer 101 or the authentication server 102, and causes the external storage device provided in the printing apparatus 103 to hold the printing format restriction information. Here, the printing format restriction information is held in a table format such that a printing purpose and a permitted printing format are combined together.

The printing format restriction information may be acquired from the holding unit provided in the authentication server 102 shown in FIG. 1 and held in the non-volatile holding unit provided in the printing apparatus 103. However, the administrator having an administrative authority controls, in an administrative mode, a printing purpose for each user and printing format restriction information for each printing purpose to be held in the holding unit.

In the external storage device provided in the printing apparatus 103, the contents set in a setting screen for which a printing format restriction set by the operation unit is provided are stored. Then, copy processing is performed using a selected copy mode.

When the printing apparatus 103 holds the table information shown in FIG. 5 in the external storage device thereof, a copy execution state can be controlled as described below in accordance with the number of times used, the number of available times, and the number of printable pages set for each user or each group.

FIG. 21 shows an example of a login screen of the printing apparatus 103 according to the second embodiment. In this example, a login screen displayed on the UI operation unit 512 (not shown) of the printing apparatus 103 shown in FIG. 1 is shown. In the second embodiment, processing for connecting a reader or the like (not shown) to the printing apparatus 103 and outputting an original image from the printing apparatus 103 is referred to as copying processing.

In the second embodiment, when a stack of document sheets is placed on an auto document feeder (ADF) or the like of a multifunction machine and documents are read via a reader, as a printing format, two pages or four pages of original image are copied on a selected sheet.

Referring to FIG. 21, a user name is entered in an input field 2001, and a password is entered in an input field 2002. When the user enters the user name and the password and presses an OK button B2, the UI interface unit 512 passes the user name and the password to a restriction ticket acquisition unit 513 (not shown) of the printing apparatus 103.

The restriction ticket acquisition unit 513 transmits the user name and the password to the authentication server 102, and requests the authentication server 102 for user authentication and a printing purpose permitted for the user.

After performing user authentication using the user name and the password, the authentication server 102 retrieves a printing purpose permitted for the user in accordance with the printing purpose table shown in FIG. 5 and the user group table shown in FIG. 6, and transmits a printing purpose list to the restriction ticket acquisition unit 513.

After receiving the printing purpose list, the restriction ticket acquisition unit 513 passes the printing purpose list to the UI operation unit 512, and a printing purpose selection screen is displayed (see FIG. 7).

When a printing purpose is selected on the printing purpose selection screen shown in FIG. 7, the selected printing purpose is transmitted via the restriction ticket acquisition unit 513 to the authentication server 102, and a restriction ticket is requested. The authentication server 102 generates a restriction ticket in the method described in the first embodiment, and transmits the generated restriction ticket.

Then, the UI operation unit 512 displays a printing format setting screen for copying in accordance with the printing format restriction described the restriction ticket.

FIG. 22 shows an example of a printing format setting screen displayed on the display unit via the UI operation unit 1004 shown in FIG. 3.

Referring to FIG. 22, reference numeral 2101 denotes a control for setting single-sided printing/duplex printing, reference numeral 2102 denotes a control for setting N-up printing, and reference numeral 2103 denotes a control for setting color printing/monochrome printing.

In the example shown in FIG. 22, a case where printing format restriction similar to the restrictions described in the restriction ticket shown in FIG. 4 are imposed is shown. For the control 2101 for setting singled-sided printing/duplex printing, single-sided printing is restricted. For the control 2102 for setting N-up printing, 1-up printing is restricted. For the control 2103 for setting color printing/monochrome printing, color printing is restricted.

When the user sets a printing format and presses a start button, copy processing is started.

When the copy processing is started, the UI operation unit 512 instructs the job management unit 508 to start a job, and generates an area in which job information is stored. Then, the restriction ticket and the printing format information designated by the user are stored in the job information storage area of the job management unit 508. The job management unit 508 instructs a scan unit 514 (not shown) to perform scanning of a paper document.

The scan unit 514 scans the paper document to create image data, and stores the image data in the print data storage unit 507. Then, in the print data interpreter 509, the image storage unit 510, and the printer engine 511, printing is performed in accordance with the job information stored in the job management unit 508 and the image data stored in the print data storage unit 507.

Third Embodiment

A configuration of a data processing program that can be read by the printing apparatus 103 according to each of the foregoing embodiments will now be described with reference to a memory map shown in FIG. 23.

FIG. 23 is an illustration for explaining a memory map of a storage medium, such as a flexible disk or a CD-ROM, in which various data processing programs that can be read by the printing apparatus 103 according to each of the foregoing embodiments of the present invention are stored.

In addition to, for example, version information and a creator, information that depends on an operating system (OS) on a program reading side or the like, such as an icon that identifies the program, may be stored.

Furthermore, data depending on various programs is controlled by the above-mentioned directory. In addition, a program for installing the various programs into a computer, a decompressing program for decompressing a compressed program to be installed, and the like may be stored.

The functions shown in FIGS. 17 to 20 in the foregoing embodiments may be executed by a host computer in accordance with an externally installed program. In this case, the present invention is also applicable to a case where an information group including the program is supplied from a storage medium, such as a CD-ROM, a flash memory, or a flexible disk, or from an external storage medium via a network, to an output device.

As described above, a storage medium on which program code of software for realizing the functions of the foregoing embodiments is recorded is supplied to a system or an apparatus. Aspects of the present invention may be achieved by reading and executing the program code stored in the storage medium by a computer (or a CPU or a microprocessing unit (MPU)) of the system or the apparatus.

In this case, the program code itself read from the storage medium attains new functions of the foregoing embodiments, and the storage medium storing the program code constitutes the present invention.

Thus, any type of program, such as object code, a program to be executed by an interpreter, or script data to be supplied to the OS, may be used as long as it includes a function of a program.

The storage medium for supplying a program may be, for example, a flexible disk, a hard disk, an optical disc, a magneto-optical disc, an MO, a CD-ROM, a compact disc-recordable (CD-R), a compact disc-rewritable (CD-RW), a magnetic tape, a nonvolatile memory card, a ROM, a digital versatile disc (DVD), or the like.

In this case, the program code itself read from the storage medium attains the above-described functions of the foregoing embodiments, and the storage medium storing the program code constitutes the present invention.

In addition, the program may be supplied by connecting to a homepage on the Internet using a browser of a client computer and by downloading a computer program according to an aspect of the present invention or a compressed file having an automatic installation function from the homepage to a storage medium, such as a hard disk. In addition, the program may be supplied by dividing the program code constituting the program according to an aspect of the present invention into a plurality of files and by downloading the divided files from different homepages. That is, a World Wide Web (WWW) server, a file transfer protocol (FTP) server, and the like for allowing a plurality of users to download a program file for realizing function processing of an aspect of the present invention on a computer are also included in the present invention.

A program according to an aspect of the present invention may be encoded and stored in a storage medium, such as a CD-ROM, and may be distributed to users. Only a user who satisfies predetermined conditions may be able to download key information for decoding the encoded program from a homepage via the Internet. In addition, the encoded program can be executed by using the downloaded key information and can be installed to a computer.

In addition, the functions of the foregoing embodiments can be attained not only by executing the read program code by the computer but also by performing part or all of the actual processing by an OS or the like running on the computer on the basis of instructions of the program code.

Furthermore, the program code read from the storage medium may be written to a memory arranged in a function expansion board inserted into the computer or a function expansion unit connected to the computer. The functions of the foregoing embodiments can also be attained by performing part or all of the actual processing by the CPU or the like arranged in the function expansion board or the function expansion unit on the basis of instructions of the program code.

The present invention is not limited to the foregoing embodiments. Various changes including organic combinations of the foregoing embodiments may be made within the spirit and scope of the present invention. Such various modifications may also fall within the scope of the present invention.

Various examples and embodiments of the present invention have been explained. It should be understood by those skilled in the art that the spirit and scope of the present invention are not limited to a specific description of this specification.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-100195 filed Mar. 31, 2006, which is hereby incorporated by reference herein in its entirety.

What is claimed is:

1. A printing apparatus including an operation unit, the printing apparatus comprising:
   a processor;
   an identification unit, implemented by the processor, that identifies a group to which a user who has issued a printing request belongs from a plurality of groups;
   a setting unit, implemented by the processor, that sets selectable printing purposes associated with the identified group;
   a selection unit, implemented by the processor, that controls to select one of the printing purposes set by the setting unit and displayed on the operation unit;
   an acquisition unit, implemented by the processor, that acquires printing format restriction information corresponding to the printing purpose selected by the selection unit from a storage device of the printing apparatus, wherein an available number of times is set to the printing format restriction information corresponding to the printing purpose;
   an execution-instructing unit, implemented by the processor, that issues an instruction for execution of printing processing within a range of the printing format restriction information acquired by the acquisition unit;
   a reception unit, implemented by the processor, that receives a print job from an information processing apparatus; and
   a restricting unit, implemented by the processor, that restricts execution of the print job in accordance with the printing format restriction information when the printing format restriction information is added to the print job received by the reception unit,
   wherein, when the identification unit identifies that the user who has issued the printing request belongs to more than one of the plurality of groups, the setting unit sets a plurality of printing purposes in accordance with the logical OR of selectable printing purposes associated with the more than one of the plurality of groups,
   wherein the restricting unit includes a determination unit that determines whether the number of pages of the print job output thus far exceeds the maximum number of output pages set in the printing format restriction information, and
   wherein when the determination unit determines that the number of pages of the print job output thus far does not exceed the maximum number of output pages, the execution of the print job is continued, and when the determination unit determines that the number of pages of the print job output thus far exceeds the maximum number of output pages, the execution of the print job is terminated before completion.

2. The printing apparatus according to claim 1, further comprising:
   a display unit, implemented by the processor, that displays a printing setting screen for setting a plurality of printing formats on the operation unit; and
   a control unit, implemented by the processor, that displays, in accordance with the printing format restriction information acquired by the acquisition unit, a printing format to be restricted by being masked on the printing setting screen displayed on the operation unit such that the printing format to be restricted is not selectable.

3. A non-transitory computer-readable storage medium storing instructions which, when executed by a printing apparatus, causes the printing apparatus to perform operations comprising:
   identifying a group to which a user who has issued a printing request belongs from a plurality of groups;
   displaying selectable printing purposes associated with the identified group;
   controlling to select one of the displayed printing purposes;
   acquiring printing format restriction information corresponding to the selected printing purpose from a storage device of the printing apparatus, wherein an available number of times is set to the printing format restriction information corresponding to the printing purpose;
   issuing an instruction for execution of printing processing within a range of the acquired printing format restriction information;
   receiving a print job from an information processing apparatus; and
   restricting execution of the print job in accordance with the printing format restriction information when the printing format restriction information is added to the print job received in the receiving step,
   wherein, when it is identified in the identifying step that the user who has issued the printing request belongs to more than one of the plurality of groups, a plurality of printing purposes is displayed in the displaying step in accordance with the logical OR of selectable printing purposes associated with the more than one of the plurality of groups,
   wherein the restricting step includes determining whether the number of pages of the print job output thus far exceeds the maximum number of output pages set in the printing format restriction information, and
   wherein when it is determined in the determining step that the number of pages of the print job output thus far does not exceed the maximum number of output pages, the execution of the print job is continued, and when it is determined in the determining step that the number of pages of the print job output thus far exceeds the maximum number of output pages, the execution of the print job is terminated before completion.

* * * * *